(12) United States Patent
Petrachek et al.

(10) Patent No.: US 12,428,845 B2
(45) Date of Patent: Sep. 30, 2025

(54) SEAL ASSEMBLY METHOD AND APPARATUS

(71) Applicant: Platinum Technologies Ltd., Etobicoke (CA)

(72) Inventors: John G. Petrachek, Etobicoke (CA); Joel P. Vieira, Etobicoke (CA); Doug F. Maikawa, Etobicoke (CA)

(73) Assignee: Platinum Technologies Ltd., Etobicoke (CA)

( * ) Notice: Subject to any disclaimer, the term of this patent is extended or adjusted under 35 U.S.C. 154(b) by 354 days.

(21) Appl. No.: 17/591,966

(22) Filed: Feb. 3, 2022

(65) Prior Publication Data

US 2022/0251846 A1 Aug. 11, 2022

Related U.S. Application Data

(60) Provisional application No. 63/146,248, filed on Feb. 5, 2021.

(51) Int. Cl.
*E04D 13/04* (2006.01)
*E04D 13/064* (2006.01)

(52) U.S. Cl.
CPC ..... *E04D 13/0409* (2013.01); *E04D 13/0645* (2013.01); *E04D 2013/0436* (2013.01)

(58) Field of Classification Search
CPC ....... F16L 21/002; F16L 21/005; F16L 21/04; F16L 21/045; F16L 21/08; F16L 25/14; F16L 27/0816; F16L 27/1017; F16L 27/12; F16L 15/02; F16L 37/53; F16L 51/02; F16L 51/023; F16L 51/022; F16L 51/027; F16L 55/162; F16L 55/163; F16L 17/00; F16L 17/02; E04D 2013/0436
USPC .......................................................... 285/42
See application file for complete search history.

(56) References Cited

U.S. PATENT DOCUMENTS

| | | | | |
|---|---|---|---|---|
| 3,610,275 | A * | 10/1971 | Determan | F16K 31/22 137/430 |
| 4,505,499 | A | 3/1985 | Uglow et al. | |
| 4,850,617 | A * | 7/1989 | Moberly | E03C 1/20 285/137.11 |
| 5,141,633 | A | 8/1992 | Walczak et al. | |
| 5,297,817 | A * | 3/1994 | Hodges | F16L 23/024 285/15 |
| 5,695,222 | A * | 12/1997 | Hodges | E03D 11/16 285/15 |

* cited by examiner

*Primary Examiner* — Aaron M Dunwoody
(74) *Attorney, Agent, or Firm* — SMART & BIGGAR LP (57) ABSTRACT

A seal assembly, including a first conduit member having a first seat and a second conduit member having a second seat. The second conduit member is coupled to the first conduit member such that the first and second conduit members are movable between at least a rest configuration in which the first and second seats are a rest distance apart, and a compressed configuration in which the first and second seats are held at a compressed distance apart. The compressed distance is less than the rest distance. The seal assembly also includes a flexible seal received between the first and second seats such that the flexible seal is compressed when the first and second conduit members are in the compressed configuration, the flexible seal expanding axially outwards when compressed to engage with an inner surface of a body in which the seal assembly is received.

9 Claims, 8 Drawing Sheets

SEAL ASSEMBLY METHOD AND APPARATUS

CROSS-REFERENCE TO RELATED APPLICATIONS

This application claims the benefit of U.S. Provisional Patent Application No. 63/146,248, filed on Feb. 5, 2021. The entire contents of U.S. Provisional Patent Application No. 63/146,248 is hereby incorporated by reference.

FIELD

The specification relates generally to seal assemblies, and more specifically to seal assemblies that include a compressible flexible seal.

BACKGROUND

U.S. Pat. No. 4,505,499 to Uglow et al. ("Uglow") purports to disclose a pipe coupling device for sealably securing a cylindrical outlet end of a roof drain insert, slidable within a larger diameter roof drain pipe, coaxially within the drain pipe. The coupling device comprises a compressible, rubber tubular member which when uncompressed is slidable into the drain pipe and which on compression by axially directed compressive forces expands radially outwardly sufficiently to sealably engage with interior surfaces of the drain pipe. The rubber tube is adapted on compression to sealably engage the drain insert. Screws which are turned to apply axial compressive forces to the rubber tube lie radially inside of the drain insert and are accessible for activation through the inlet end of the drain insert. The new pipe coupling provide a means to mechanically locate the drain insert securely within an existing roof drain.

U.S. Pat. No. 5,141,633 to Walczak et al. ("Walczak") purports to disclose a drain insert having an insert pipe of smaller diameter than the standing drainpipe into which the insert fits, and an elastomeric, tubular sleeve surrounding and seal-bonded to the outside of one end of the insert pipe so that a portion of the sleeve extends axially beyond that end of the insert pipe. Walczak purports to disclose that a rigid, conical frustum is provided, the smaller end of which frustum is of lesser diameter than the internal diameter of the sleeve, the larger end of which has a diameter greater than the internal diameter of the sleeve but less than the internal diameter of the drainpipe. Walczak purports to disclose that, coupled to the frustum and extending axially therefrom are a pair of elongated rods adapted to be inserted axially along the insert pipe. Walczak purports to disclose that the rods are long enough so that when the frustum is adjacent the sleeve, the other ends of the rods, which are threaded, extend outside of the inlet end of the insert pipe and through holes in a bridge to tabs extending across the pipe inlet end. Walczak also purports to disclose that nuts are threaded onto the threaded ends of the rods, and when turned will bear against the bridge or tabs so as to draw the frustum against the sleeve and expand the latter radially to effect a seal.

SUMMARY

The following summary is intended to introduce the reader to various aspects of the applicant's teaching, but not to define any invention.

According to some aspects, there is provided a seal assembly, comprising a first conduit member having a first seat; a second conduit member having a second seat, the second conduit member coupled to the first conduit member such that the first and second conduit members are movable between at least two configurations, the at least two configurations including a rest configuration in which the first and second seats are a rest distance apart and a passage extends through the first and second conduit members along a longitudinal axis of the seal assembly, and a compressed configuration in which the first and second seats are held at a compressed distance apart and the passage extends through the first and second conduit members along the longitudinal axis, the compressed distance being less than the rest distance; and a flexible seal received between the first and second seats such that the flexible seal is compressed when the first and second conduit members are in the compressed configuration, the flexible seal expanding radially outwards when compressed to engage with an inner surface of a body in which the seal assembly is received.

In some examples, the flexible seal includes at least one adhesive sealing surface arranged to engage with the inner surface of the body when the flexible seal is compressed.

In some examples, the flexible seal includes a main body having a circumferential groove therein and an adhesive member received in the groove, the adhesive sealing surface formed on the adhesive member.

In some examples, the flexible seal includes a plurality of axially spaced-apart circumferential grooves and a plurality of adhesive members, each adhesive member received in a groove and having an adhesive sealing surface arranged to engage with the inner surface of the body when the flexible seal is compressed.

In some examples, the seal assembly further comprises at least one fastener, the at least one fastener coupling the first and second conduit members together and holding the first and second conduit members in a rigid relationship in the compressed configuration.

In some examples, the at least one fastener is operable to move the first and second conduit members between the rest configuration and the compressed configuration.

In some examples, each of the at least one fastener is a threaded fastener, and the at least one fastener is operable to move the first and second conduit members between the rest configuration and the compressed configuration via rotation of each of the at least one fastener.

In some examples, the at least one fastener is a plurality of threaded members.

In some examples, each of the plurality of threaded members has a hexagonal head.

In some examples, the flexible seal is sleeved over the first and second conduit members.

In some examples, the flexible seal has a contoured exterior surface.

In some examples, the contoured exterior surface is shaped to provide at least one redundant sealing interface with the inner surface of the body when the flexible seal is compressed.

In some examples, the contoured exterior surface of the flexible seal is shaped to engage with the inner surface of the body along at least three axially spaced-apart raised circumferential ridges.

In some examples, the first and second conduit members are shaped to prevent the first and second seats being drawn together closer than the compressed distance when the first and second conduit members are moved from the rest configuration to the compressed configuration.

In some examples, the seal assembly includes a hard stop built into the first and second conduit members to prevent the first and second seats being drawn together closer than the compressed distance when the first and second conduit members are moved from the rest configuration to the compressed configuration.

In some examples, the hard stop includes at least one first projection on the first conduit member and at least one second projection on the second conduit member, the first and second projections arranged to prevent the first and second seats being drawn together closer than the compressed distance when the first and second conduit members are moved from the rest configuration to the compressed configuration.

In some examples, the seal assembly includes an assembly axis, and the first and second conduit members are shaped to prevent the first and second conduit members from rotating relative to one another about the assembly axis when moving between the rest configuration and the compressed configuration.

In some examples, the seal assembly includes a linear rail to prevent the first and second conduit members from rotating relative to one another about the assembly axis when moving between the rest configuration and the compressed configuration.

In some examples, the linear rail includes a linear projection on one of the first and second conduit members and a sleeve on the other of the first and second conduit members.

According to some aspects, there is provided a method of assembling a flexible seal of a seal assembly, comprising placing an adhesive member in a circumferential groove of the flexible seal, the adhesive member including at least one adhesive sealing surface arranged to engage with the inner surface of the body when the flexible seal is compressed.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or process described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the examples described herein may be practiced without these specific details. In other instances, well-known methods, procedures, and components have not been described in detail so as not to obscure the examples described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Figure 1:
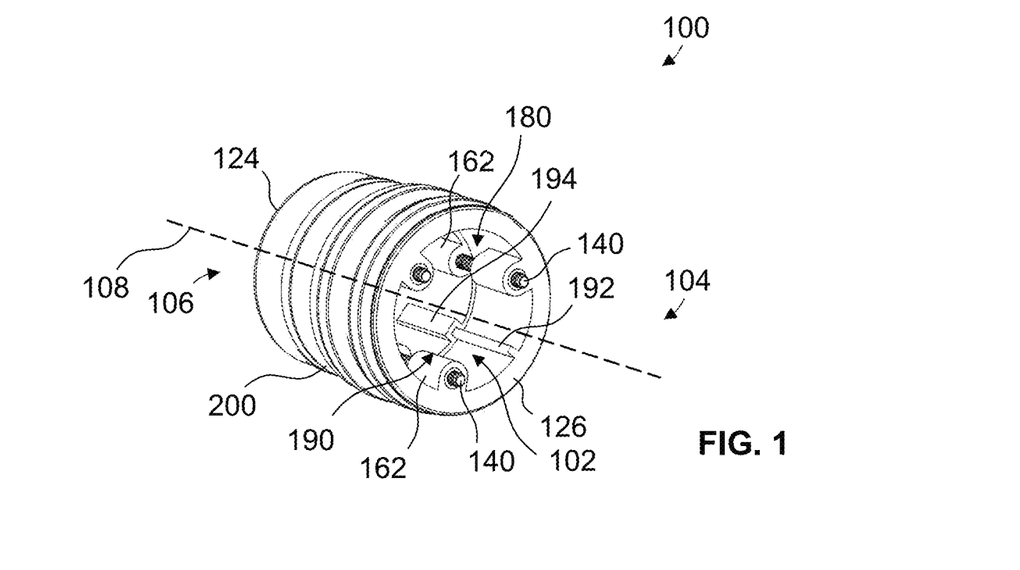
FIG. 1 is a bottom perspective view of a seal assembly.
Figure 2:
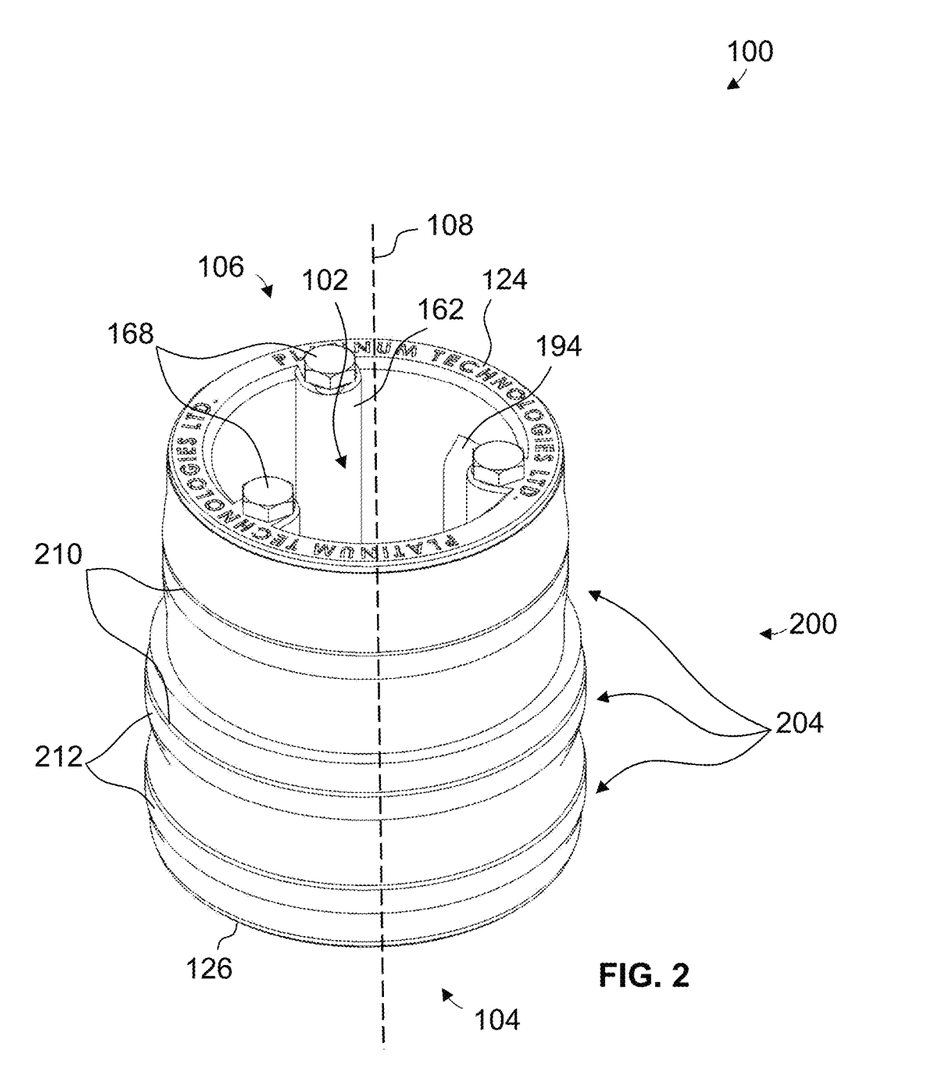
FIG. 2 is a top perspective view of the seal assembly of FIG. 1.

Referring to FIGS. 1 and 2, illustrated is an example of a seal assembly 100. The seal assembly 100 may be used to seal a junction between, e.g., two pipes. For example, two pipes may be arranged end-to-end (e.g., an end of one pipe received inside an end of the other). Two pipes may be arranged end-to-end and forming a drain from, e.g., a roof, and the seal assembly 100 may be used to seal the junction between the two pipes. The seal assembly 100 includes a passage 102 extending between a first end (e.g., an upper end) 104 of the seal assembly 100 and a second end (e.g., a lower end) 106 along a longitudinal axis 108 of the seal assembly 100. The passage 102 is provided to carry fluids (e.g., water draining off of a roof) past the junction sealed by the seal assembly 100. Accordingly, the seal assembly 100 may be a drain seal (e.g., for sealing a junction in a drain of a flat roof).

Figure 3:
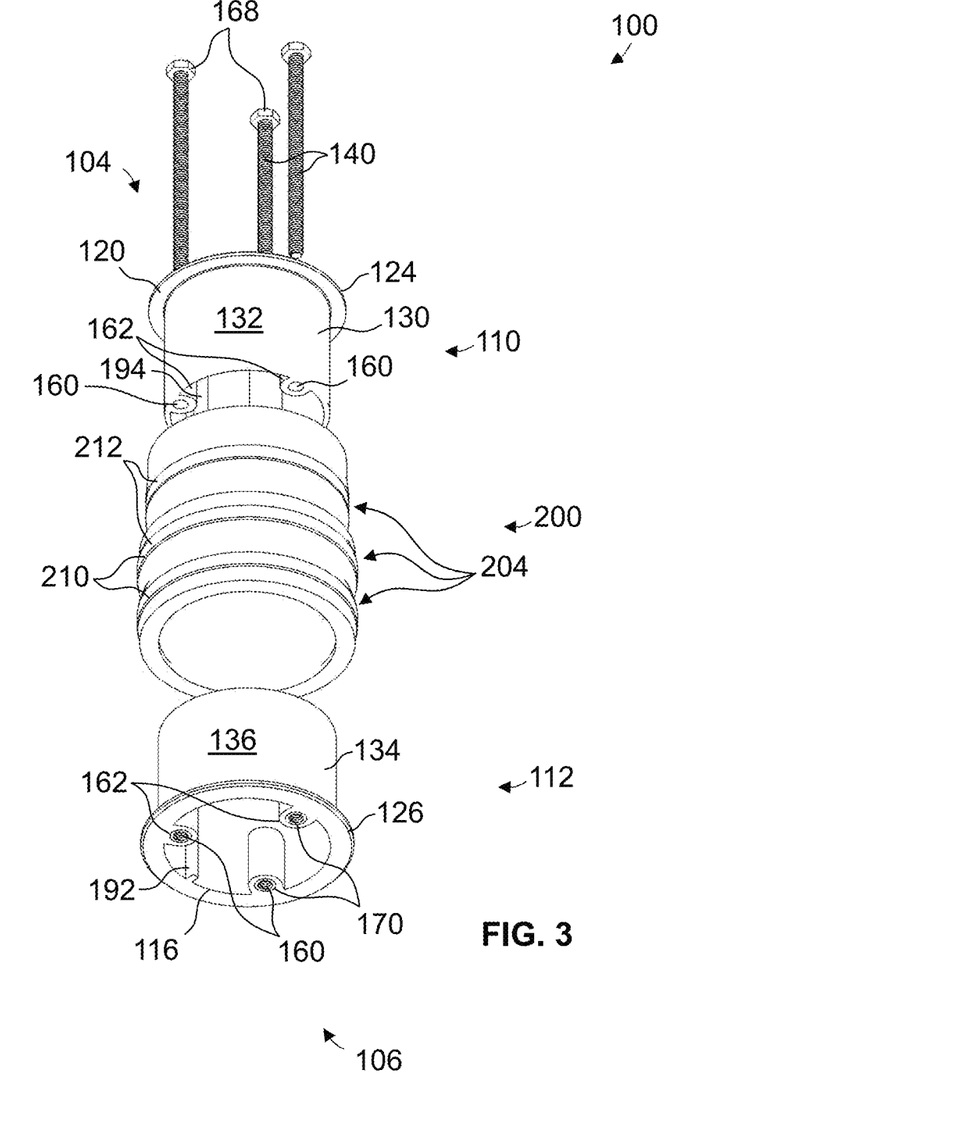
FIG. 3 is a bottom perspective exploded view of the seal assembly of FIG. 1.
Figure 4:
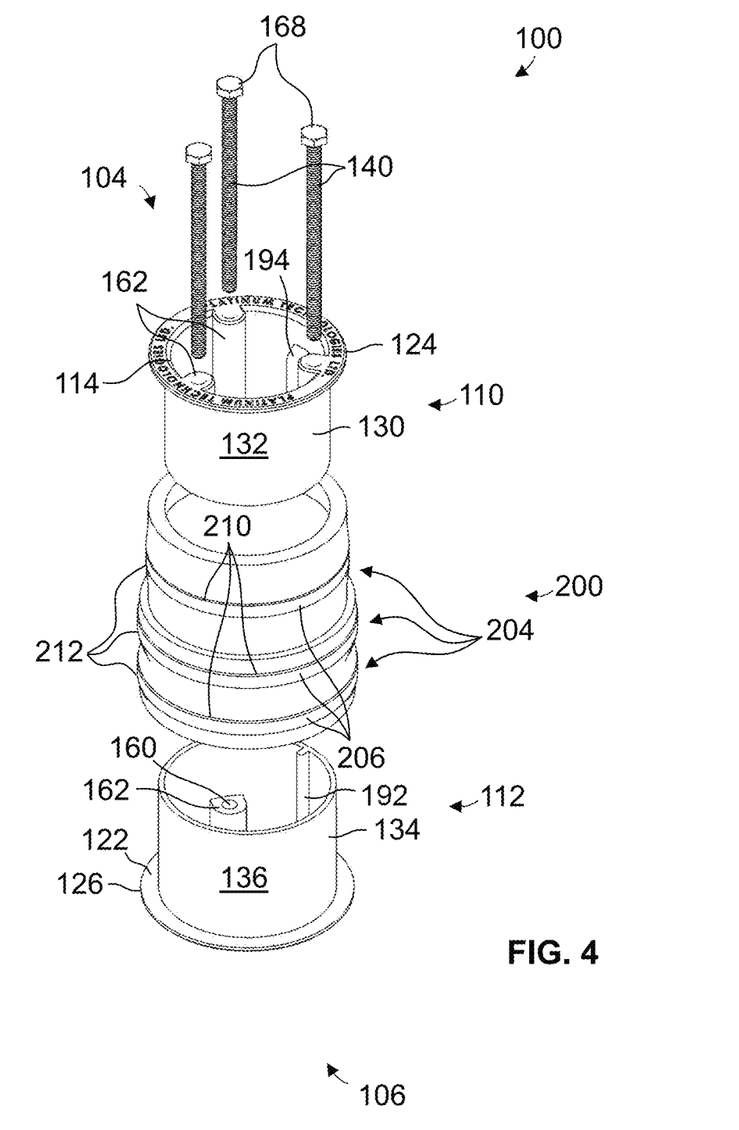
FIG. 4 is a top perspective exploded view of the seal assembly of FIG. 1.

Referring now to FIGS. 3 and 4, the seal assembly 100 includes a first conduit member 110 and a second conduit member 112. The first conduit member 110 is at the first end 104 of the seal assembly 100, and may form a first end port 114. The second conduit member 112 is at the second end 106 of the seal assembly 100, and may form a second end port 116. The passage 102 may extend between the first and second end ports 114, 116.

The first conduit member 110 includes a first seat 120, and the second conduit member 112 includes a second seat 122. As in the illustrated example, the first and second seats 120, 122 may be arranged on exterior surfaces of the first and second conduit members 110, 112. The first and second seats 120, 122 may each be formed by a respective flange 124, 126 extending from an exterior surface of a conduit sidewall.

In the illustrated example, the seal assembly 100 is shaped for use with cylindrical piping. The first conduit member 110 includes a first cylindrical sidewall 130 (i.e., defining a conduit therethrough), and the first seat 120 is arranged on an exterior surface 132 of the first cylindrical sidewall 130. Similarly, the second conduit member 112 includes a second cylindrical sidewall 134 (i.e., defining a conduit therethrough), and the second seat 122 is arranged on an exterior surface 136 of the second cylindrical sidewall 134.

The first and second conduit members 110, 112 are coupled to one another. In some examples, the seal assembly 100 includes at least one fastener 140. The at least one fastener 140 may couple the first and second conduit members 110, 112 together. The at least one fastener 140 may hold the first and second conduit members 110, 112 in a rigid relationship (i.e., rigidly coupled) in the compressed configuration. The fastener(s) 140 may be, as illustrated, a screw or bolt, or may be another fastener such as a latching system or threaded body portion.

The conduit members may be selectively movable relative to one another. In some examples, as in the illustrated example, one of the first and second conduit members 110, 112 may be sized to fit within the other (i.e., one cylindrical sidewall small enough to fit within the other). Accordingly, the conduit members 110, 112 may move axially relative to one another as one slides within the other.

Figure 5:
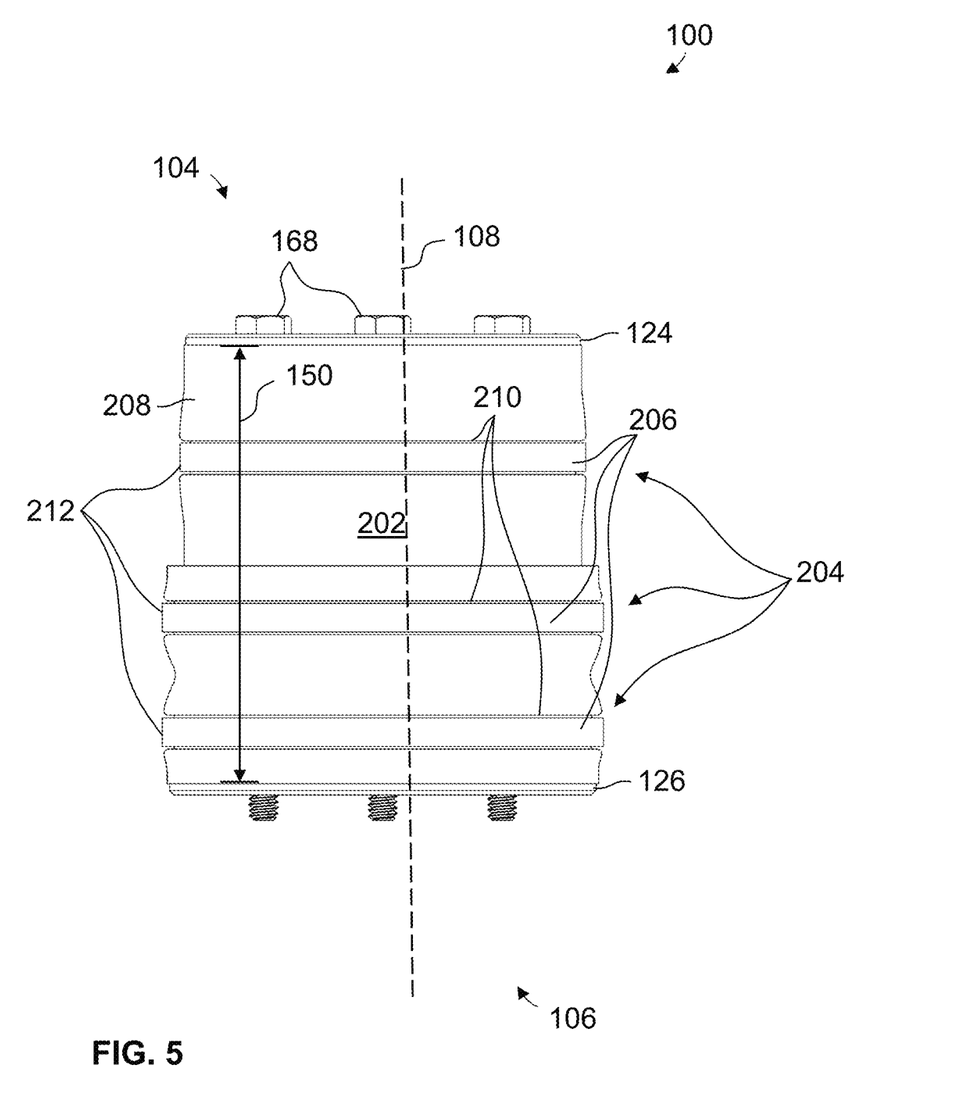
FIG. 5 is a side view of the seal assembly of FIG. 1 in a rest configuration.
Figure 6:
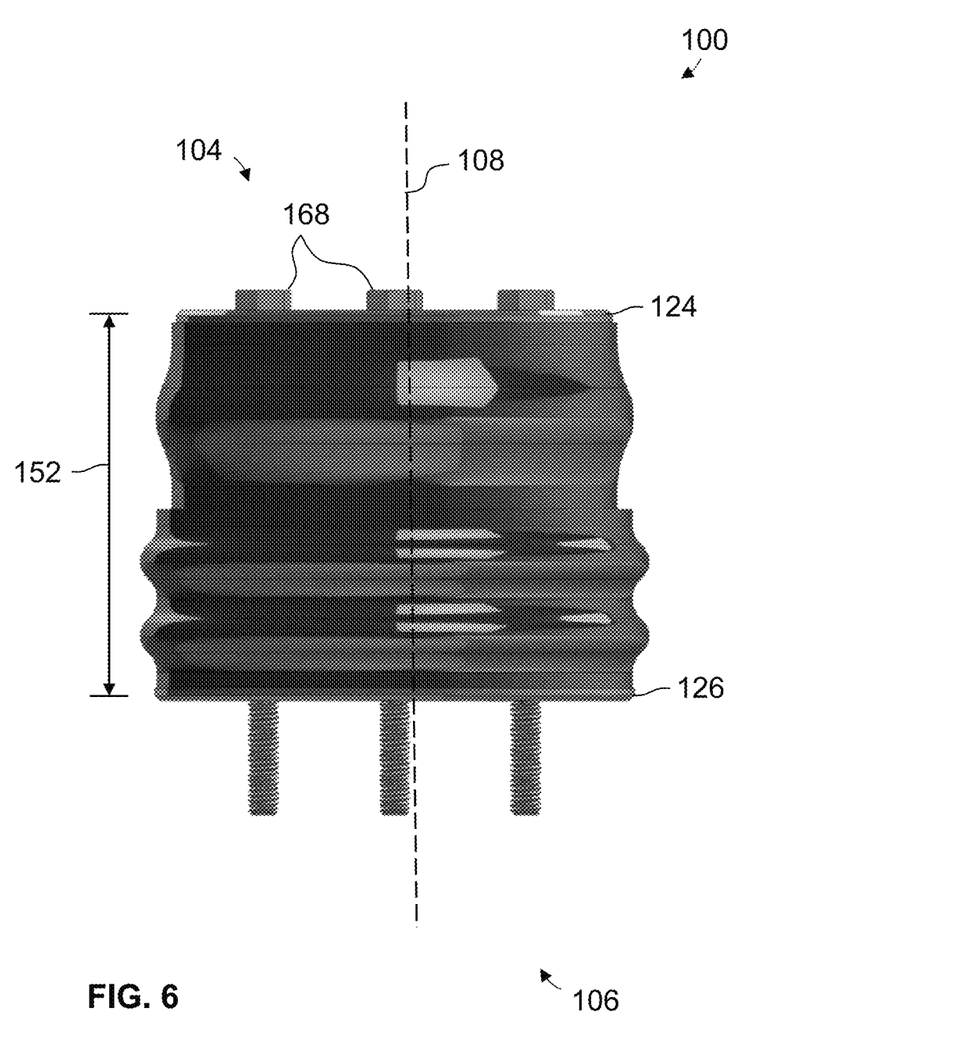
FIG. 6 is a side view of the seal assembly of FIG. 1 in a contracted configuration.

Referring now to FIGS. 5 and 6, the first and second conduit members are coupled together such that the first and second conduit members 110, 112 are movable between at least two configurations. The at least two configurations includes a rest configuration (FIG. 5) and a compressed configuration (FIG. 6). In the rest configuration (FIG. 5), the first and second seats 120, 122 are a rest distance 150 apart. In the compressed configuration the first and second seats 120, 122 are held at a compressed distance 152 apart. The compressed distance 152 is less than the rest distance 150. Accordingly, a flexible member received between the first and second seats 120, 122 may be axially compressed when the first and second conduit members 110, 112 are in the compressed configuration. As in the illustrated example, in each of the rest and compressed configurations the passage 102 extends through the first and second conduit members 110, 112 along the longitudinal axis 108.

Referring again to FIGS. 3 and 4, in some examples, the at least one fastener 140 is operable to move the first and second conduit members 110, 112 between the rest configuration and the compressed configuration. For example, each of the at least one fasteners 140 may include a threaded fastener (e.g., a screw or bolt), and each of the first and second conduit members 110, 112 may include a threaded hole 160 (e.g., in a boss 162) for each of the at least one fasteners 140. Threading the threaded fastener(s) 140 into the threaded hole(s) 160 may draw the first and second conduit members 110, 112 together, and opposite rotation of the threaded fastener(s) 140 may move the first and second conduit members 110, 112 apart. Accordingly, the at least one fastener 140 may be operable to move the first and second conduit members 110, 112 between the rest configuration and the compressed configuration via rotation of each of the at least one fastener.

As in the illustrated example, the at least one fastener 140 may be a plurality of fasteners (e.g., three). The fasteners 140 may be screws or bolts, and the first and second conduit members 110, 112 may have holes 160 arranged to receive the fasteners 140 parallel to the longitudinal axis 108 and spaced from one another about the longitudinal axis 108, as illustrated.

Each of the fasteners 140 may be a bolt. A bolt head may reduce the chance of stripping the head 168 when threading the bolts in. In some examples, each bolt has a hexagonal head 168. For example, the bolts may be ¼"—20 hex bolts. The larger thread size may improve overall strength. The hexagonal head 168 may reduce the chance of stripping the head 168 and/or allow for installation with a common socket (e.g., a common 7/16" socket).

In some examples, at least one of the first and second conduit members 110, 112 includes at least one threaded insert 170 (FIG. 3) in at least one threaded hole 160 (e.g., in the second member 112 adjacent the port 116). The threaded insert(s) 170 may be of a stronger material (e.g., a different plastic, such as a denser or harder plastic) than the rest of the conduit member to reduce the chance of the threaded fastener 140 stripping the threading of the conduit member. In some examples, the conduit member may be molded (e.g., injection molded or 3D printed) of plastic, and formed with one or more insert in the mold ahead of the molding process (i.e., the rest of the body of the conduit member molded over the insert). The plastic of the body may also be thickened around the insert to provided improved strength.

The first and second conduit members 110, 112 may be shaped to prevent the first and second seats 120, 122 being drawn together closer than the compressed distance 152 when the first and second conduit members 110, 112 are moved from the rest configuration to the compressed configuration. This may prevent an assembler (e.g., an individual working on a roof) from over-torqueing the assembly 100, which may damage the assembly 100.

Referring again to FIG. 1, as in the illustrated example, the seal assembly 100 may include a hard stop 180, such as a compression hard stop, built into the first and second conduit members 110, 112 to prevent the first and second seats 120, 122 being drawn together closer than the compressed distance 152 when the first and second conduit members 110, 112 are moved from the rest configuration to the compressed configuration. The hard stop 180 may include at least one first projection (e.g., a boss 162 in the illustrated example) on the first conduit member 110 and at least one second projection (e.g., a boss 162 in the illustrated example) on the second conduit member 112. The first and second projections are arranged to prevent the first and second seats 120, 122 being drawn together closer than the compressed distance 152 when the first and second conduit members 110, 112 are moved from the rest configuration to the compressed configuration (i.e., by the projections bottoming-out on each other).

Referring still to FIG. 1, in some examples, the first and second conduit members 110, 112 are shaped to prevent the first and second conduit members 110, 112 from rotating relative to one another about the longitudinal axis 108 (i.e., an assembly axis) when moving between the rest configuration and the compressed configuration. For example, as in the illustrated example, the seal assembly 100 may include a linear rail 190 to prevent the first and second conduit members 110, 112 from rotating relative to one another about the assembly axis 108 when moving between the rest configuration and the compressed configuration.

Figure 7:
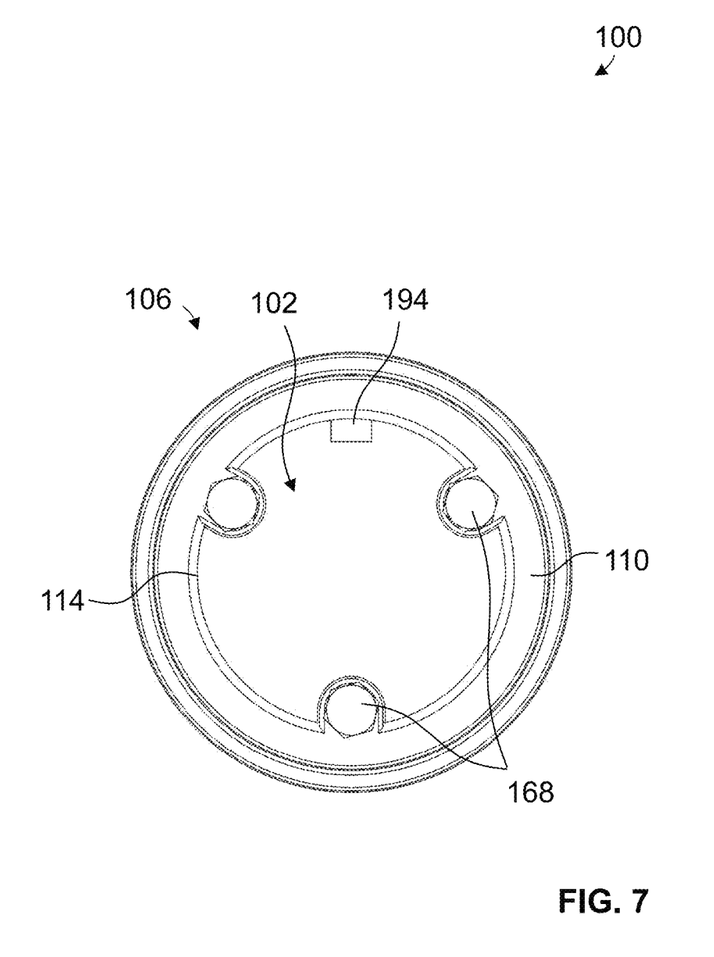
FIG. 7 is a top view of the seal assembly of FIG. 1.

The linear rail 190 includes a linear projection 192 on one of the first and second conduit members 110, 112 and a sleeve 194 (see also FIG. 7) on the other of the first and second conduit members 110, 112. Accordingly, with the rail 192 received in the sleeve 194, the first and second conduit members 110, 112 are prevented from rotating relative to one another about the axis 108, but permitted to move axially relative to one another (i.e., between the rest configuration and the compressed configuration).

Referring now to FIGS. 5 and 6, the seal assembly 100 also includes a flexible seal 200 received between the first and second seats 120, 122 such that the flexible seal 200 is compressed when the first and second conduit members 110, 112 are in the compressed configuration. The flexible seal 200 is shaped to expand radially outwards (i.e., outwards from the longitudinal axis 108) when compressed to engage with an inner surface of a body in which the seal assembly 100 is received (e.g., an inner surface of a pipe junction of two pipes arranged end-to-end). For example, the flexible seal 200 may flex outwards against a drainstack of a drain to seal against the drainstack.

In some examples, as illustrated, the flexible seal 200 is cylindrical. The flexible seal 200 may be arranged as a sleeve over the first and second conduit members 110, 112 (i.e., between the first and second seats 120, 122).

The flexible seal 200 may have a contoured exterior surface 202. The contoured exterior surface 202 may be shaped to provide at least one redundant sealing interface with the inner surface of the body when the flexible seal 200 is compressed. In some examples, as in the illustrated example, the contoured exterior surface 202 of the flexible seal 200 is shaped to engage with the inner surface of the body along a plurality (e.g., at least three) of axially spaced-apart raised circumferential ridges 204.

In some examples, the flexible seal 200 includes at least one adhesive sealing surface 206 arranged to engage with the inner surface of the body in which the sealing assembly 100 is received when the flexible seal 200 is compressed. The adhesive sealing surface 206 may provide a better seal between the sealing assembly 100 and the inner surface of the body in which the sealing assembly 100 is received than a pressure seal alone. In some examples, the adhesive sealing surface 206 may be covered with a removable liner until the assembly 100 is ready for installation to prevent the surface 206 from adhering to other surfaces prematurely.

In some examples, the flexible seal 200 includes a main body 208 having at least one circumferential groove 210 therein and an adhesive member 212 (e.g., a bead of sealant or a trip of tape) received in the groove. The adhesive sealing surface 206 may be formed on the adhesive member 212. The grooves 210 may make assembly of the flexible seal 200 easier, since the adhesive member 212 may be placed in the groove. However, in some examples, the adhesive member 212 may be applied without the grooves 210.

Referring still to FIGS. 5 and 6, in some examples, as in the illustrated example, the flexible seal 200 includes a plurality of axially spaced-apart circumferential grooves 210 and a plurality of adhesive members 212. Each adhesive member 212 of the plurality of adhesive members may be received in a groove 210 and may have an adhesive sealing surface 206 arranged to engage with the inner surface of the body when the flexible seal 200 is compressed. In some examples, as in the illustrated example, each of the raised circumferential ridges 204 includes at least one of the adhesive members 212 and/or at least one of the adhesive surfaces 206.

The adhesive surface 206 may be a permanently tacky surface. The adhesive surface 206 and/or adhesive member 212 may be resistant to cold flow and/or have low moisture vapor transmission. In some examples, the adhesive member 212 includes a sealant tape. For example, the adhesive member 212 may include ¼" wide 5354 sealant tape from 3M™ Company.

The flexible seal 200 may be formed of a rubber or plastic. In some examples, the flexible seal 200 is formed of thermoplastic polyurethane ("TPU") material. TPU material may be preferred over other materials, such as ethylene propylene diene monomer ("EPDM") rubber. For example, TPU material may be easier to bond with and/or easier to form into intricate shapes. Accordingly, the flexible seal 200 may more easily include the groove 210 and/or bond to the adhesive member 212.

In some examples, assembling the flexible seal 200 of the seal assembly 100 includes placing the adhesive member 212 in the circumferential groove 210 of the flexible seal 200. The flexible seal body may be formed separately (e.g., injection molded, with or without inserts 170), and the adhesive member(s) added afterwards.

Figure 8:
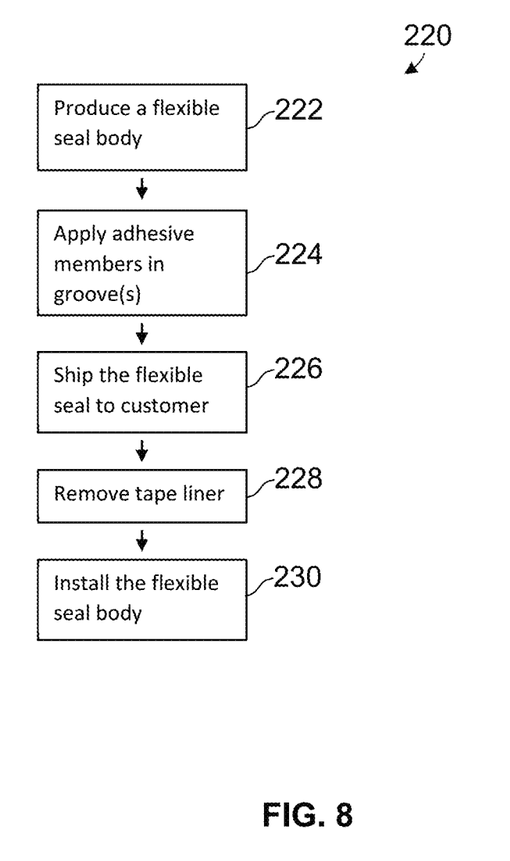
FIG. 8 is a flow diagram of a method of creating a flexible seal.

For example, referring to FIG. 8, a method 220 of creating a flexible seal 200 may include, at step 222, producing the flexible seal body 208. The flexible seal body 208 is produced with grooves 210, and at step 224, method 220 includes applying adhesive members 212 (e.g., sealant tape covered by a removable liner). A step 226 of shipping the flexible seal to a customer may follow step 224, and at step 228 following step 226 the tape liner is removed and, at step 230, the flexible body 200 is installed (e.g., the seal assembly 100 is applied).

The assembly 100 may be applied by joining the first and second conduit members 110, 112, sleeving the flexible seal 200 over the first and second conduit members 110, 112, removing a protective layer from the adhesive member(s) 212, inserting the assembly 100 into a body adjacent a junction, and then moving the first and second conduit members together to a compressed configuration to compress the flexible seal 200 and force the flexible seal out against the interior walls of the body at the junction to seal the junction while allowing fluid through the junction via the passage 102 in the assembly 100.

The present invention has been described here by way of example only. Various modification and variations may be made to these exemplary embodiments without departing from the scope of the invention, which is limited only by the appended claims.

The invention claimed is:

1. A seal assembly, comprising:
  a first conduit member having a first seat;
  a second conduit member having a second seat, the second conduit member coupled to the first conduit member such that a passage extends through the first and second conduit members along a longitudinal axis of the seal assembly and the first and second conduit members are moveable between at least two configurations, the at least two configurations including:
    a rest configuration in which the first and second seats are a rest distance apart, and a compressed configuration in which the first and second seats are held at a compressed distance apart, the compressed distance being less than the rest distance; and a flexible seal received between the first and second seats such that the flexible seal is compressed when the first and second conduit members are in the compressed configuration, the flexible seal expanding radially outwards when compressed to engage with an inner surface of a body in which the seal assembly is received, and wherein the flexible seal includes at least one adhesive sealing surface comprising adhesive arranged to engage with the inner surface of the body when the flexible seal is compressed.

2. The seal assembly of claim 1, wherein the flexible seal includes a main body having a circumferential groove therein and an adhesive member received in the groove, the adhesive sealing surface formed on the adhesive member.

3. The seal assembly of claim 2, wherein the flexible seal includes a plurality of axially spaced-apart circumferential grooves and a plurality of adhesive members, each adhesive member received in a groove and having an adhesive sealing surface arranged to engage with the inner surface of the body when the flexible seal is compressed.

4. The seal assembly of claim 1, wherein the flexible seal is sleeved over the first and second conduit members.

5. A method of assembling the flexible seal of the seal assembly of claim 1, comprising placing an adhesive member in a circumferential groove of the flexible seal, the adhesive member including at least one adhesive sealing surface arranged to engage with the inner surface of the body when the flexible seal is compressed.

6. A seal assembly, comprising:
a first conduit member having a first seat;
a second conduit member having a second seat, the second conduit member coupled to the first conduit member such that a passage extends through the first and second conduit members along a longitudinal axis of the seal assembly and the first and second conduit members are moveable between at least two configurations, the at least two configurations including:
a rest configuration in which the first and second seats are a rest distance apart, and
a compressed configuration in which the first and second seats are held at a compressed distance apart, the compressed distance being less than the rest distance; and
a flexible seal received between the first and second seats such that the flexible seal is compressed when the first and second conduit members are in the compressed configuration, the flexible seal expanding radially outwards when compressed to engage with an inner surface of a body in which the seal assembly is received, and
wherein the flexible seal has a contoured exterior surface.

7. The seal assembly of claim 6, wherein the contoured exterior surface is shaped to provide at least one redundant sealing interface with the inner surface of the body when the flexible seal is compressed.

8. The seal assembly of claim 7, wherein the contoured exterior surface of the flexible seal is shaped to engage with the inner surface of the body along at least three axially spaced-apart raised circumferential ridges.

9. The seal assembly of claim 6, wherein the flexible seal is sleeved over the first and second conduit members.

* * * * *